(12) United States Patent
Hosudurg et al.

(10) Patent No.: US 12,265,639 B2
(45) Date of Patent: Apr. 1, 2025

(54) SYSTEM AND METHOD FOR ENABLING DIFFERENTIAL PRIVACY TECHNIQUES

(71) Applicant: Tata Consultancy Services Limited, Mumbai (IN)

(72) Inventors: Anantha Desik Puranam Hosudurg, Hyderabad (IN); Prachi Shastri, Pune (IN); Ashim Roy, Pune (IN); Sumiran Naman, Pune (IN); Pranit Reke, Pune (IN); Venkata Bala Tripura Sundari Nallamreddy, Hyderabad (IN); Nikhil Patwardhan, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 232 days.

(21) Appl. No.: 17/813,882

(22) Filed: Jul. 20, 2022

(65) Prior Publication Data

US 2023/0130637 A1     Apr. 27, 2023

(30) Foreign Application Priority Data

Oct. 21, 2021   (IN) .............................. 202121047996

(51) Int. Cl.
*G06F 21/62* (2013.01)
*G06F 16/2455* (2019.01)

(52) U.S. Cl.
CPC .... *G06F 21/6218* (2013.01); *G06F 16/24568* (2019.01); *G06F 21/6245* (2013.01)

(58) Field of Classification Search
CPC ...................... G06F 21/6245; G06F 16/24568
See application file for complete search history.

(56) References Cited

U.S. PATENT DOCUMENTS

| | | |
|---|---|---|
| 11,100,274 B2 | 8/2021 | Khoo |
| 11,487,765 B1 * | 11/2022 | Aydore ............ G06F 16/24568 |
| 2019/0147188 A1 * | 5/2019 | Benaloh ............ G06F 21/6245 |
| | | 726/26 |

FOREIGN PATENT DOCUMENTS

CN           110727957 A        1/2020

OTHER PUBLICATIONS

Prasser, Fabian et al., "ARX—A Comprehensive Tool for Anonymizing Biomedical Data", AMIA Annual Symposium Proceedings, Date: Nov. 2014, pp. 984-993, Publisher: NCBI, https://www.ncbi.nih.gov/pmc/articles/PMC4419984/pdf/1984395.pdf.

(Continued)

*Primary Examiner* — Barbara B Anyan
(74) *Attorney, Agent, or Firm* — FINNEGAN, HENDERSON, FARABOW, GARRETT & DUNNER LLP (57) ABSTRACT

Existing systems provide data selection for one differential technique considering an analytical problem or synthetic data but not an arrangement for selection of one or more techniques together. The embodiments herein provide a method and system for differential privacy enabled service with hybrid rule management and similarity metrics to select data. The system generates a query table called universal data from the associates tables and databases. The system further based on query on the universal table of single columns or selected columns with different parameters using different privacy rules generates differential private data stored in temp tables/views. The system retrieves queried data of different techniques and parameters interactively viewing the privacy and similarity of each data types of retrieved data with universal data using different metrics like bar charts, Histograms, average, std. and correlation to select (Continued)

right different privacy data of the universal data based on Privacy and similarity tolerances.

9 Claims, 5 Drawing Sheets

(56) References Cited

OTHER PUBLICATIONS

Mcsherry, Frank, "Privacy Integrated Queries", SIGMOD '09: Proceedings of the 2009 ACM SIGMOD International Conference on Management of data, Date: Jul. 2009, pp. 19-30, Publisher: Microsoft, https://www.microsoft.com/en-us/research/wp-content/uploads/2009/06/sigmod115-mcsherry.pdf.

Abuah, Chike et al., "DDUO: General-Purpose Dynamic Analysis for Differential Privacy", Programming Languages—Cryptography and Security, Date: Mar. 2021, Publisher: Arxiv, https://arxiv.org/pdf/2103.08805.pdf.

\* cited by examiner

SYSTEM AND METHOD FOR ENABLING DIFFERENTIAL PRIVACY TECHNIQUES

CROSS-REFERENCE TO RELATED APPLICATIONS AND PRIORITY

This U.S. patent application claims priority under 35 U.S.C. § 119 to Indian Application number 202121047996, filed on Oct. 21, 2021. The entire contents of the aforementioned application are incorporated herein by reference.

TECHNICAL FIELD

The disclosure herein generally relates to a field of a differential privacy and more specifically, to a system and method for differential privacy enabled service with hybrid rule management and similarity metrics to select data.

BACKGROUND

The differential privacy is one of the emerging techniques in the modern data privacy techniques to create privacy enabled data with statistical similarities to the original data. This is achieved by a set of techniques by adding noise to the data, observing the similarity of new data with original data using statistical metrics (Histogram, pie chart, mean etc.).

The existing tools provide data selection for one differential technique considering an analytical problem or synthetic data but not an arrangement for selection of one or more techniques together. Further, the existing tools lack iterative query processing by different techniques and an interactive evaluation with number of metrics to find privacy and similarity trade-off of the data selection. The existing tools are also not compatible for switching from techniques combination, and epsilon & sensitivity values the system may help reducing the privacy loss of the query.

SUMMARY

Embodiments of the disclosure present technological improvements as solutions to one or more of the above-mentioned technical problems recognized by the inventors in conventional systems. For example, in one embodiment, a method and system for differential privacy enabled service with hybrid rule management and similarity metrics to select data is provided.

In one aspect, a processor-implemented method for a differential privacy enabled service with a hybrid rule management and a similarity metrics to select data is provided. The method includes one or more steps such as receiving, via an input/output interface, one or more sensitivity parameters of a data, an epsilon value, a plurality of differential privacy techniques, and a privacy budget selected by a user, fetching the data from a predefined database to generate a production data for a differential privacy, profiling the production data based on type and nature of the structured data, changing the data types based on the profiling of the production data to create a staging data for analytical purpose, selecting at least one differential privacy technique from the plurality of differential privacy techniques based on the one or more sensitive data fields of the staging data, the epsilon value, the sensitivity parameters of the data, and the privacy budget, applying the selected at least one differential privacy technique iteratively on the staging data and an incremental addition of epsilon value at each iteration, and finally enabling the user to select the differential privacy enabled data based on one or more results of the selected differential privacy technique application.

In another aspect, a system is configured for a differential privacy enabled service with a hybrid rule management and a similarity metrics to select data is provided. The system includes an input/output interface configured to receive one or more sensitive data fields for privacy enablement, one or more sensitivity parameters of a data, an epsilon value, a plurality of differential privacy techniques, and a privacy budget selected by a user, one or more hardware processors and at least one memory storing a plurality of instructions, wherein the one or more hardware processors are configured to execute the plurality of instructions stored in at least one memory.

Further, the system is configured to fetching the data from a predefined database to generate a production data for a differential privacy, profiling the production data based on type and nature of the structured data, changing the data types based on the profiling of the production data to create a staging data for analytical purpose, selecting at least one differential privacy technique from the plurality of differential privacy techniques based on the sensitive data fields of the staging data, the epsilon value, one or more sensitive data fields for privacy enablement, the sensitivity parameters of the data, and the privacy budget, applying the selected at least one differential privacy technique iteratively on the staging data and an incremental addition of epsilon value at each iteration, and finally enabling the user to select the differential privacy enabled data based on one or more results of the selected differential privacy technique application.

In yet another aspect, one or more non-transitory machine-readable information storage mediums are provided comprising one or more instructions, which when executed by one or more hardware processors causes a method for a differential privacy enabled service with a hybrid rule management and a similarity metrics to select data is provided. The method includes one or more steps such as receiving, via an input/output interface, one or more sensitive data fields for privacy enablement, one or more sensitivity parameters of the data, an epsilon value, a plurality of differential privacy techniques, and a privacy budget selected by a user, fetching the data from a predefined database to generate a production data for a differential privacy, profiling the production data based on type and nature of the structured data, changing the data types based on the profiling of the production data to create a staging data for analytical purpose, selecting at least one differential privacy technique from the plurality of differential privacy techniques based on the sensitive data fields of the staging data, the epsilon value, the sensitivity parameters of the data, and the privacy budget, applying the selected at least one differential privacy technique iteratively on the staging data and an incremental addition of epsilon value at each iteration, and finally enabling the user to select the differential privacy enabled data based on one or more results of the selected differential privacy technique application.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for differential privacy enabled service with hybrid rule management and similarity metrics to select data. It is to be noted that the differential privacy adds noise to an aggregate query to protect privacy without significantly affecting the outcome. The differential privacy addresses most of the limitations of the traditional approaches like k-anonymity. If there are two identical databases, one with the required information and another without, differential privacy ensures that the probability of a statistical query to produce a given result is nearly the same for both the databases.

Further, the ingenuity of the differential privacy is that it protects privacy, while allowing a meaningful analysis on the dataset. It adds noise to individual data, which is averaged out when the data is aggregated to deliver results much closer to the original. In the differential privacy techniques, epsilon is an important parameter, which represents the strength of the privacy protection. A higher epsilon indicates less protection, while a lower epsilon indicates more protection. The differential privacy frameworks provide techniques for analyzing the value of epsilon and its impact on the data analysis result in terms of the data privacy.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

Figure 1:
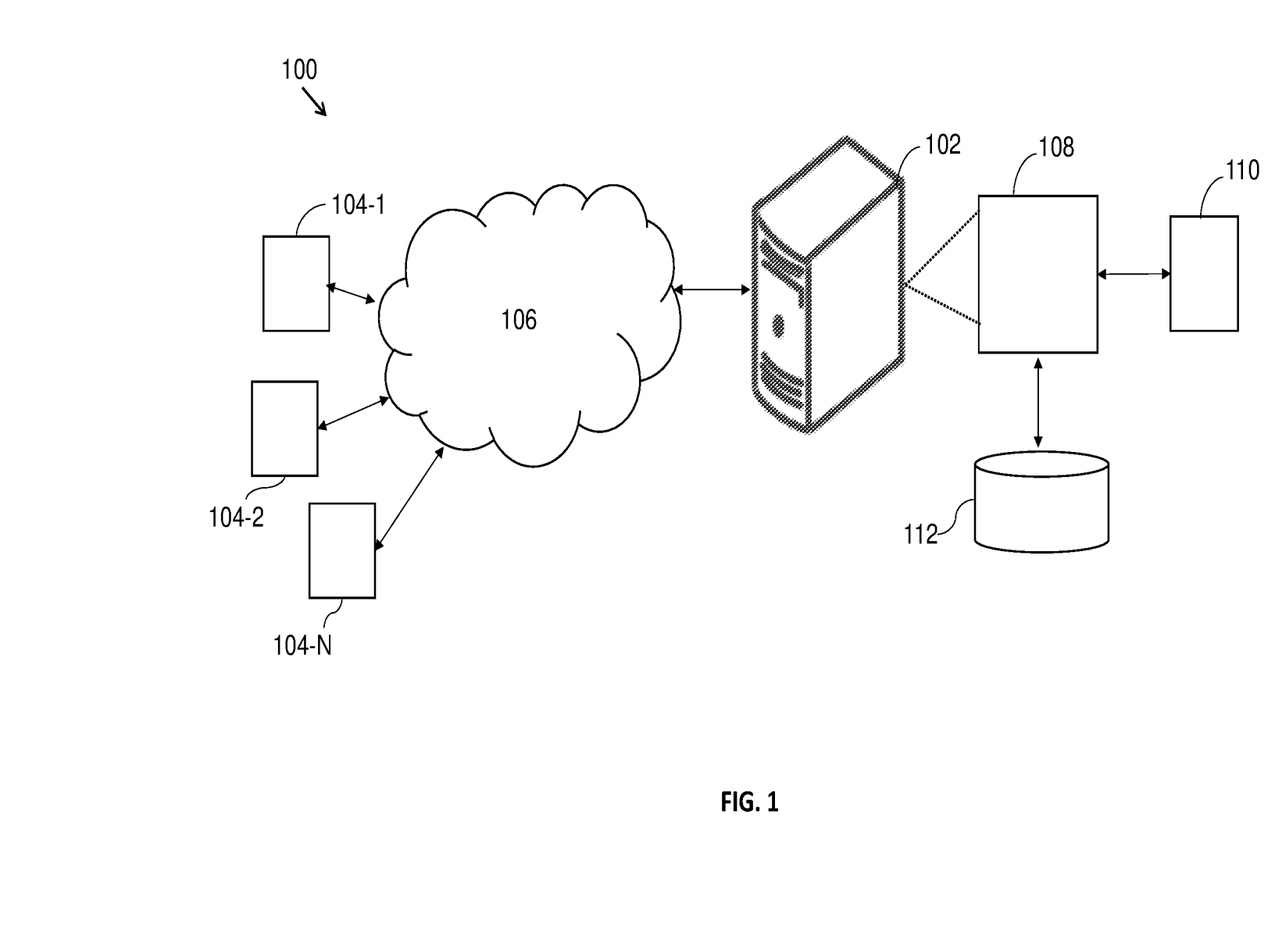
FIG. 1 illustrates an exemplary system for differential privacy enabled service with hybrid rule management and similarity metrics to select data in accordance with some embodiments of the present disclosure.

FIG. 1 illustrates a block diagram of a system (100) for enabling users to select at least one differential privacy technique to be applied on the structured data, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory (110) with a plurality of instructions, one or more databases (112), and one or more hardware processors (108) which are communicatively coupled with the at least one memory (110) to execute a plurality of modules therein. The one or more I/O interfaces (104) are configured to receive one or more sensitive data fields for privacy enablement, one or more sensitivity parameters of a structured data, an epsilon value, a plurality of differential privacy techniques, and a privacy budget that is related to times of querying to structured data selected by a user. It is to be noted that the epsilon value helps in identifying how much noise can be added to the structured data and it also explains sensitivity of the structured data. The one or more I/O interfaces (104) are also configured to enable the user to select the differential privacy enabled structured data based on one or more results of the selected differential privacy technique application. The components and functionalities of the system (100) are described further in detail.

In one embodiment, the system (100) is configured to fetch the structured data from a predefined database to generate a production data for a differential privacy. Herein, the structured data is labelled and in a tabular form.

Figure 2:
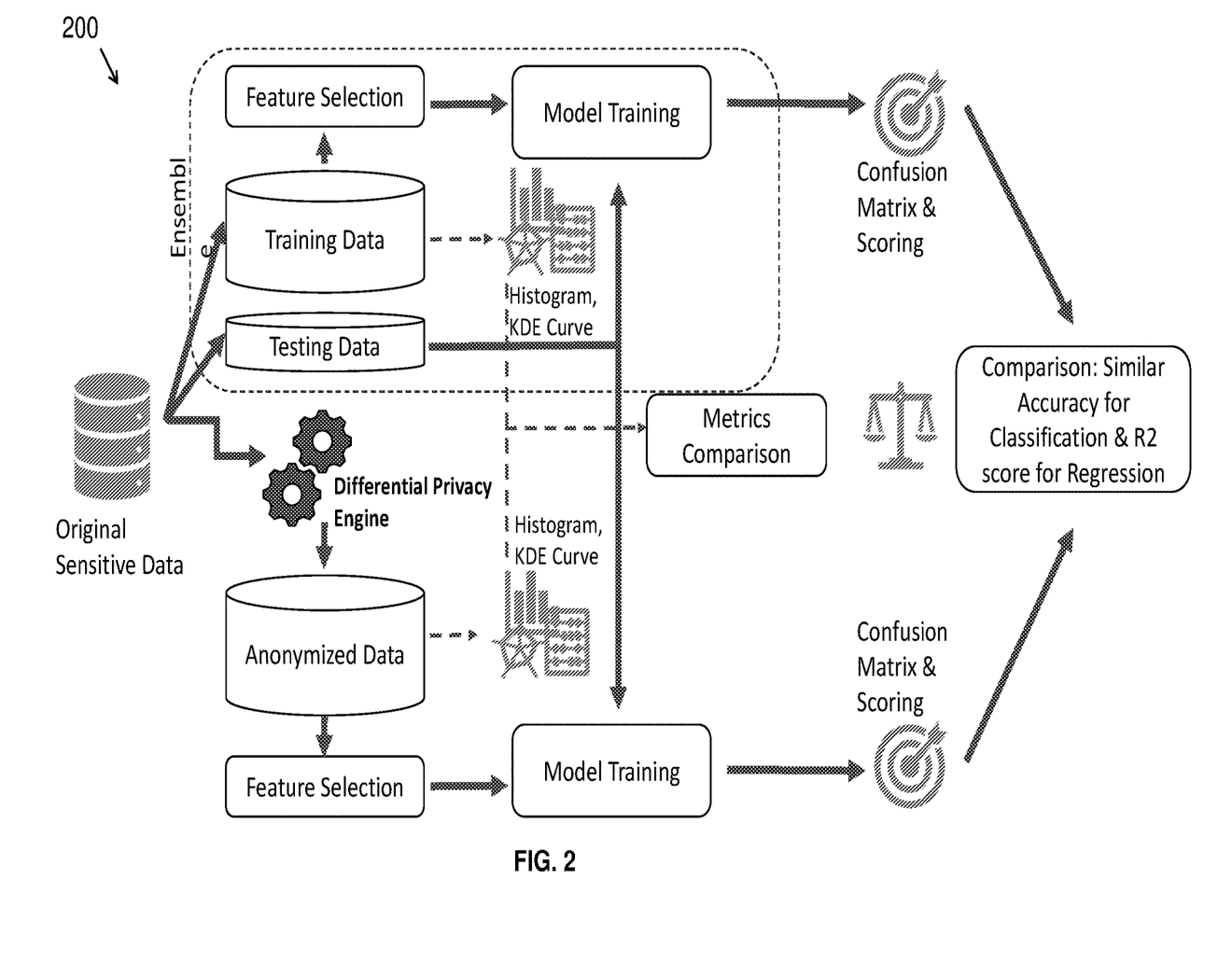
FIG. 2 illustrates a functional block diagram to illustrate the exemplary system in accordance with some embodiments of the present disclosure.

Referring FIG. 2, a functional block diagram (200) to illustrate the system (100), wherein for masking the data columns in a database based on a masking template, the system (100) describes masking template at least one rule and hybrid of rules based on one column and multiple columns. The system (100) generates a query table called universal data from the associates tables and databases. The system (100) further based on query on the universal table of single columns or selected columns with different parameters using different privacy rules generates differential private data stored in temp tables/views. The system (100) able to retrieve the queried data of different techniques and parameters interactively viewing the privacy and similarity of each data types of retrieved data with universal data using different metrics like bar charts, Histograms, average, std. and correlation to select right different privacy data of the universal data based on Privacy & similarity tolerances.

Further, the system (100) is configured to profile the generated production data based on type and nature of the structured data. Herein, type of structured data includes a numerical, a categorical, a binary and in a text form which may be in continuous, discrete, Integer and Boolean nature.

Figure 3:
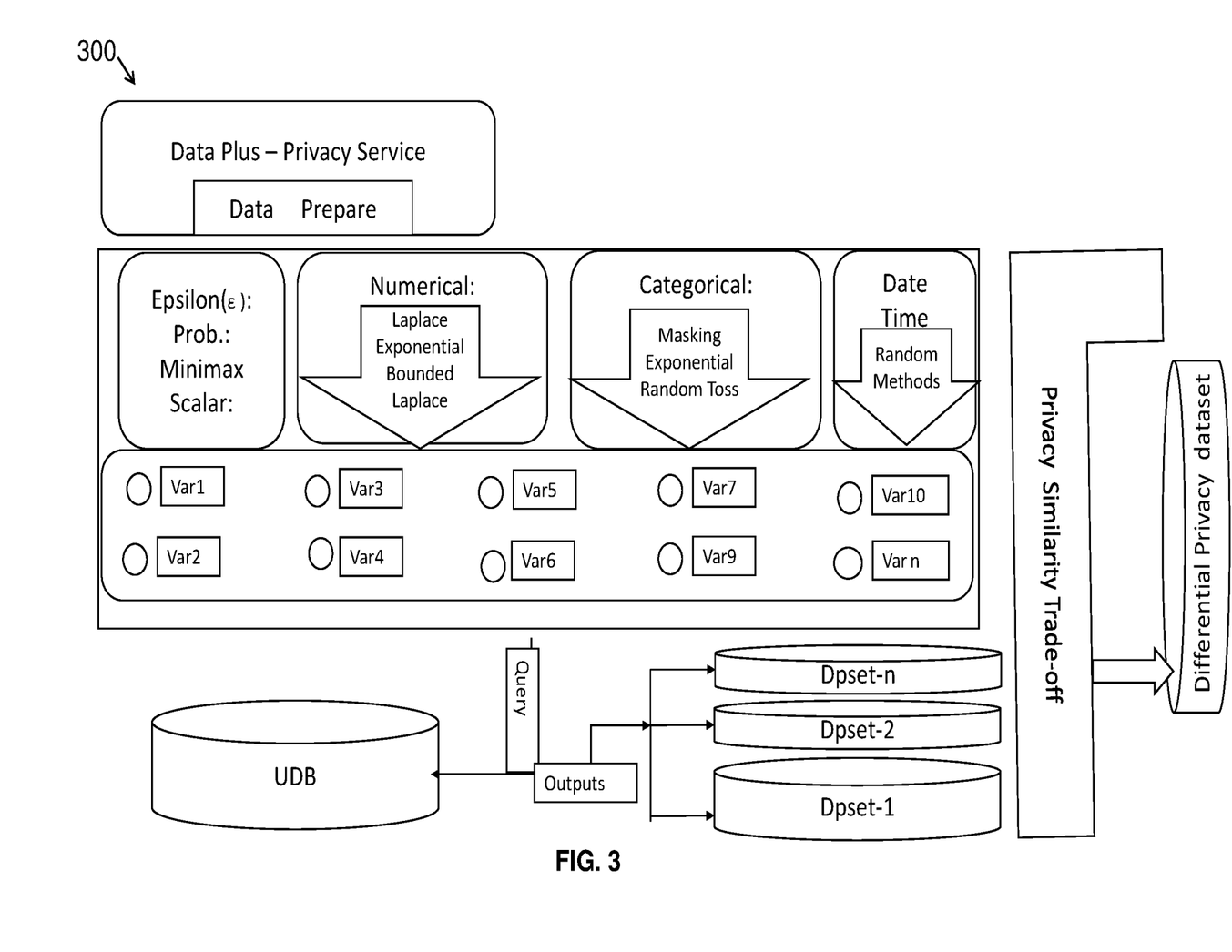
FIG. 3 illustrates a functional block diagram to illustrate differential privacy enabled dataset generation in accordance with some embodiments of the present disclosure.

Referring FIG. 3, a functional block diagram (300) to illustrate the system (100) to change the data types based on the profiling of the production data to create a staging data for analytical purposes.

Further, the system (100) selects at least one differential privacy technique from the plurality of differential privacy techniques based on the sensitive data fields of the staging data, the epsilon value, the sensitivity parameters of the data and the privacy budget. The one or more differential privacy techniques comprising a Laplace classic, a Laplace bounded, an exponential and a random toss. It is to be noted that the Laplace classic where noise will be added based on the Laplace curve and good for large data. The Laplace bounded preserves the data boundaries and strong text and categorical fields runs on exponential random algorithm. The random loss is used for Boolean and binary data to create a new data based on randomness and probability.

In view of the data privacy control, organizations which provide dash boarding of financial reports of other institutions, instead of original data the organizations can use privacy enabled data to achieve the same outcome in terms of Histograms for real time dash boarding. Some other organization use differential privacy for storing the data for analytical purpose to do the analytical models on privacy data in real time within a regulatory compliance.

In another embodiment, the system (100) is configured to apply the selected at least one differential privacy technique iteratively on the staging data and an incremental addition of the epsilon value at each iteration. Herein, the incremental addition of the epsilon at each iteration is based on a privacy loss at each iteration that is less than the privacy budget.

Figure 4:
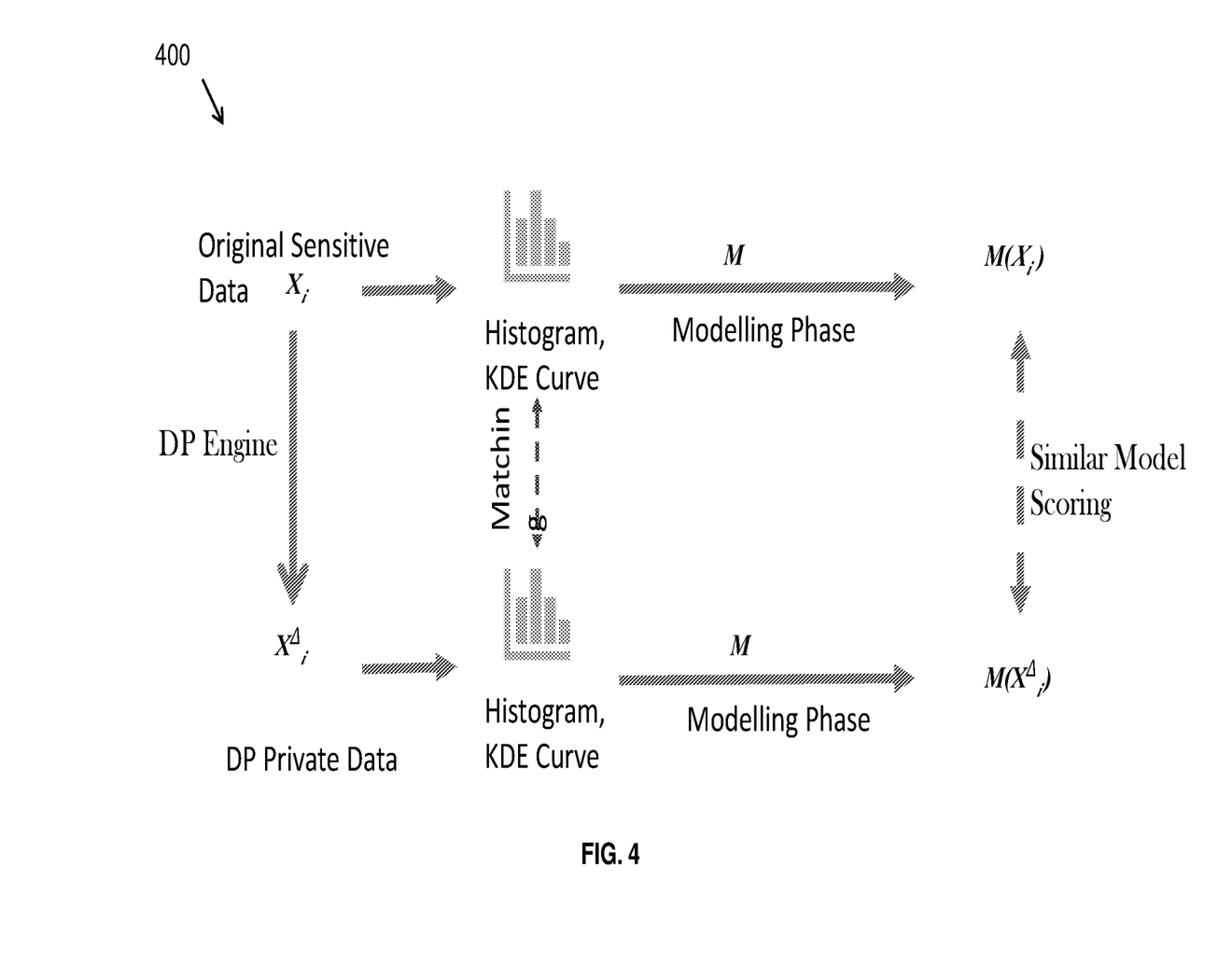
FIG. 4 illustrates a schematic diagram to illustrate differential privacy in accordance with some embodiments of the present disclosure.

Referring FIG. 4, a schematic diagram (400) denotes that privacy and similarity metrics of original sensitive data will match with the privacy and similarity metrics of differentially private data. The models developed on differentially private data may give similar accuracies as models developed on the original sensitive data and hence can act as a substitute for models developed on the original sensitive data and the models developed on differentially private data can be used in real-time scenarios.

In one example, wherein the user produces a kind of object such as privacy database with collection of summary statistics or sanitized database once and for all. The structured data is privacy enabled and similar to original data so that the structured data can be used for dashboarding or analytical model development same as original data in real time purpose.

In yet another embodiment, the system is configured to enable the user to select the differential privacy enabled structured data based on one or more results of the selected differential privacy technique application. Herein, the one or more results include a histogram, a Kernel Density Estimation (KDE) curve, a standard deviation, a correlation for similarity strength, and a set of privacy metrics. The privacy metrics comprise of a privacy percentage, a privacy digit match, and a privacy error. The privacy percentage is calculated based on number of matches, a number of digits mismatch, and a distance difference.

It is to be noted that the privacy metrics provides information on privacy strength to understand privacy and similarity tolerance of each query in an interactive way.

Figure 5:
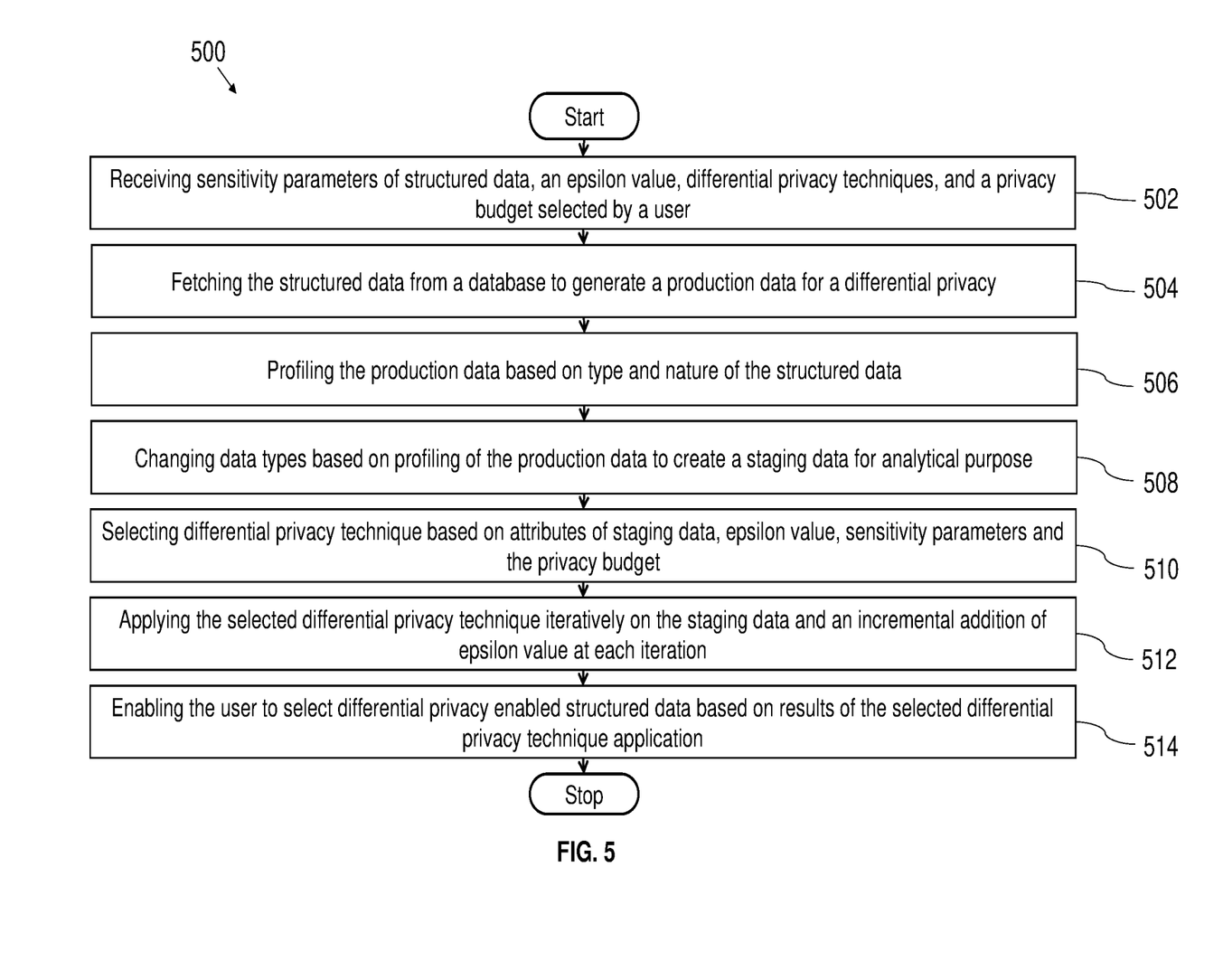
FIG. 5 is a flow diagram to illustrate a method of differential privacy enabled service with hybrid rule management and similarity metrics to select data in accordance with some embodiments of the present disclosure.

Referring FIG. 5, to illustrate a processor-implemented method (500) for differential privacy enabled service with hybrid rule management and similarity metrics to select data in accordance with an example embodiment.

Initially, at the step (502), receiving one or more sensitivity parameters of a structured data, an epsilon, a plurality of differential privacy techniques, and a privacy budget selected by a user. Herein, the epsilon and sensitivity of the data are the levers that allow to control the degree of noise being added to the sensitive data fields. For example, the epsilon may range from 0.1 to 0.9 and user is able to decide the best suitable epsilon based on the various privacy and similarity metrics. The privacy budget is shared between all data users performing a number of queries over the database exposes the data and hence the privacy budget provides necessary cover for preventing exposure of the data over repeated queries.

At the next step (504), fetching the structured data, labelled tabular data, from a predefined database to generate a production data for a differential privacy.

At the next step (206), profiling the production data based on type and nature of the structured data.

At the next step (508), changing the data types based on the profiling of the production data to create a staging data for analytical purpose.

At the next step (510), selecting at least one differential privacy technique from the plurality of differential privacy techniques based on the sensitive data fields of the staging data, the epsilon value, the sensitivity parameters of the data, and the privacy budget. The one or more differential privacy techniques comprising a Laplace classic, a Laplace bounded, an exponential and a random toss.

At the next step (512), applying the selected at least one differential privacy technique iteratively on the staging data and an incremental addition of epsilon value at each iteration, wherein the incremental addition of epsilon at each iteration is based on a privacy loss at each iteration that is less than the privacy budget.

At the last step (514), enabling the user to select the differential privacy enabled structured data based on one or more results of the selected differential privacy technique application. Herein, the one or more results comprise a histogram, a KDE Curve, a standard deviation, a correlation for similarity strength, and a set of privacy metrics.

Further, the privacy metrics comprise of a privacy percentage, a privacy Digit match, and a privacy error. The privacy metrics provides information on privacy strength to understand privacy and similarity tolerance of each query in an interactive way. It is to be noted that the privacy percentage is calculated based on number of matches, a number of digits mismatch, and a distance difference.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of existing tools that provide data selection for one differential technique considering an analytical problem or synthetic data but not an arrangement for selection of one or more techniques together. Further, the existing tools lack iterative query processing by different techniques and an interactive evaluation with number of metrics to find privacy and similarity trade-off of the data selection. The existing tools are also not compatible for switching from techniques combination, and epsilon & sensitivity values the system may help reducing the privacy loss of the query.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising steps of:
receiving, via an input/output interface, one or more sensitivity parameters of a structured data, an epsilon value, a plurality of differential privacy techniques, and a privacy budget selected by a user;
fetching, via one or more hardware processors, the structured data from a predefined database to generate a production data for a differential privacy, wherein the structured data is labelled and in a tabular form;
profiling, via the one or more hardware processors, the production data based on type and nature of the structured data, wherein the type of the structured data includes a numerical form, a categorical form, a binary form, and in a text form, and the nature of the structured data includes continuous, discrete, integer, and Boolean;
creating, via the one or more hardware processors, based on the profiling of the production data, a staging data for analytical purpose;
selecting, via the one or more hardware processors, at least one differential privacy technique from the plurality of differential privacy techniques based on one or more sensitive data fields of the staging data, the epsilon value, the sensitivity parameters of the data, and the privacy budget, wherein the plurality of differential privacy techniques comprises a Laplace classic, a Laplace bounded, an exponential and a random toss;
applying, via the one or more hardware processors, the selected at least one differential privacy technique iteratively on the staging data and an incremental addition of epsilon value at each iteration, wherein the incremental addition of epsilon at each iteration is based on a privacy loss at each iteration that is less than the privacy budget, wherein each of the selected at least one differential privacy technique generates a privacy enabled structured data, and wherein the epsilon value and the sensitivity parameters of the data are used as levers to control a degree of noise being added to the sensitive data fields by the selected at least one differential privacy technique; and enabling, via the one or more hardware processors, the user to select the differential privacy enabled structured data based on one or more results of the selected differential privacy technique application, wherein the one or more results include a set of privacy metrics providing information on privacy strength and similarity tolerance of each query in an interactive way.

2. The processor-implemented method of claim 1, wherein one or more results comprise a histogram, a KDE Curve, a standard deviation, and a correlation for similarity strength.

3. The processor-implemented method of claim 1, wherein the set of privacy metrics comprise of a privacy percentage, a privacy Digit match, and a privacy error.

4. The processor-implemented method of claim 3, wherein the privacy percentage is calculated based on number of matches, a number of digits mismatch, and a distance difference.

5. A system comprising:
an input/output interface to receive one or more sensitivity parameters of a data, an epsilon value, a plurality of differential privacy techniques, and a privacy budget selected by a user;
one or more hardware processors;
a memory in communication with the one or more hardware processors, wherein the one or more hardware processors are configured to execute programmed instructions stored in the memory, to:
fetch the structured data from a predefined database to generate a production data for a differential privacy, wherein the structured data is labelled and in a tabular form;
profile the production data based on type and nature of the structured data, wherein the type of the structured data includes a numerical form, a categorical form, a binary form, and in a text form, and the nature of the structured data includes continuous, discrete, integer, and Boolean;
create, based on the profiling of the production data, a staging data for analytical purpose;
select at least one differential privacy technique from the plurality of differential privacy techniques based on one or more sensitive data fields of the staging data, the epsilon value, the sensitivity parameters of the data, and the privacy budget, wherein the plurality of differential privacy techniques comprises a Laplace classic, a Laplace bounded, an exponential and a random toss;
apply the selected at least one differential privacy technique iteratively on the staging data and an incremental addition of epsilon value at each iteration, wherein the incremental addition of epsilon at each iteration is based on a privacy loss at each iteration that is less than the privacy budget, wherein each of the selected at least one differential privacy technique generates a privacy enabled structured data, and wherein the epsilon value and the sensitivity parameters of the data are used as levers to control a degree of noise being added to the sensitive data fields by the selected at least one differential privacy technique; and
enable the user to select the differential privacy enabled structured data based on one or more results of the selected differential privacy technique application, wherein the one or more results include a set of privacy metrics providing information on privacy strength and similarity tolerance of each query in an interactive way.

6. The system of claim 5, wherein one or more results comprise a histogram, a KDE Curve, a standard deviation, and a correlation for similarity strength.

7. The system of claim 5, wherein the set of privacy metrics comprise of a privacy percentage, a privacy Digit match, and a privacy error.

8. The system of claim 7, wherein the privacy percentage is calculated based on number of matches, a number of digits mismatch, and a distance difference.

9. A non-transitory computer readable medium storing one or more instructions which when executed by one or more processors on a system, cause the one or more processors to perform method comprising:
receiving, via an input/output interface, one or more sensitivity parameters of a structured data, an epsilon value, a plurality of differential privacy techniques, and a privacy budget selected by a user;
fetching, via one or more hardware processors, the structured data from a predefined database to generate a production data for a differential privacy, wherein the structured data is labelled and in a tabular form;
profiling, via the one or more hardware processors, the production data based on type and nature of the structured data, wherein the type of the structured data includes a numerical form, a categorical form, a binary form, and in a text form, and the nature of the structured data includes continuous, discrete, integer, and Boolean;
creating, via the one or more hardware processors, the data types-based on the profiling of the production data, a staging data for analytical purpose;
selecting, via the one or more hardware processors, at least one differential privacy technique from the plurality of differential privacy techniques based on one or more sensitive data fields of the staging data, the epsilon value, the sensitivity parameters of the data, and the privacy budget, wherein the plurality of differential privacy techniques comprises a Laplace classic, a Laplace bounded, an exponential and a random toss;
applying, via the one or more hardware processors, the selected at least one differential privacy technique iteratively on the staging data and an incremental addition of epsilon value at each iteration, wherein the incremental addition of epsilon at each iteration is based on a privacy loss at each iteration that is less than the privacy budget, wherein each of the selected at least one differential privacy technique generates a privacy enabled structured data, and wherein the epsilon value and the sensitivity parameters of the data are used as levers to control a degree of noise being added to the sensitive data fields by the selected at least one differential privacy technique; and
enabling, via the one or more hardware processors, the user to select the differential privacy enabled structured data based on one or more results of the selected differential privacy technique application, wherein the one or more results include a set of privacy metrics providing information on privacy strength and similarity tolerance of each query in an interactive way.

* * * * *